United States Patent
Marion et al.

(10) Patent No.: US 11,920,823 B2
(45) Date of Patent: Mar. 5, 2024

(54) AUTOMATED EVAPORATIVE SYSTEM FLUSH

(71) Applicant: Hog Slat, Inc., Newton Grove, NC (US)

(72) Inventors: Tyler Clay Marion, Clayton, NC (US); Timothy Glenn King, Coats, NC (US)

(73) Assignee: Hog Slat, Inc., Newton Grove, NC (US)

(*) Notice: Subject to any disclaimer, the term of this patent is extended or adjusted under 35 U.S.C. 154(b) by 138 days.

(21) Appl. No.: 17/648,973

(22) Filed: Jan. 26, 2022

(65) Prior Publication Data
US 2023/0235898 A1     Jul. 27, 2023

(51) Int. Cl.
| F24F 5/00 | (2006.01) |
| A01K 1/00 | (2006.01) |
| F28C 1/00 | (2006.01) |
| F28F 19/00 | (2006.01) |
| F24F 120/20 | (2018.01) |
| F24F 130/20 | (2018.01) |
| F28F 25/00 | (2006.01) |

(52) U.S. Cl.
CPC .......... F24F 5/0035 (2013.01); A01K 1/0082 (2013.01); F28C 1/00 (2013.01); F28F 19/00 (2013.01); F24F 2120/20 (2018.01); F24F 2130/20 (2018.01); F28F 2025/005 (2013.01)

(58) Field of Classification Search
CPC .. F24F 5/0035; F24F 2120/20; F24F 2130/20; A01K 1/0082; F28C 1/00; F28F 19/00; F28F 2025/005
See application file for complete search history.

(56) References Cited

U.S. PATENT DOCUMENTS

| 4,361,522 A | * | 11/1982 | Goettl | F28G 9/00 261/36.1 |
| 4,556,521 A | | 12/1985 | Baigas, Jr. | |
| 5,055,239 A | | 10/1991 | Thomas | |

(Continued)

FOREIGN PATENT DOCUMENTS

| CN | 210859879 U | * | 6/2020 |
| CN | 112393350 A | | 2/2021 |
| JP | 2014193565 A | * | 10/2014 |

OTHER PUBLICATIONS

Samer, M. et al., "Enhancing the efficiency of evaporative cooling pads for livestock barns and greenhouses by moisture adsorption," Agricultural Engineering International: CIGR Journal, vol. 17, No. 4, pp. 36-63.

*Primary Examiner* — Emmanuel E Duke
(74) *Attorney, Agent, or Firm* — Withrow & Terranova, PLLC

(57) ABSTRACT

An automated flush system for an evaporative cooling system may be employed in barns or other facilities that house animals to provide cooling and to reduce production loss. The evaporative cooling control system may include an automated flush system that has a controllable valve at a flush end of the cooling system. Based on a timer, the controllable valve is opened and water drains (e.g., pumped or gravity feed) out of the cooling pad enclosure. Fresh water is introduced at the "fill" end of the system, rinsing out the evaporative cooling pads. After a predetermined time, the valve at the flush end of the system is closed, and the fresh water refills the cooling pad enclosure.

20 Claims, 6 Drawing Sheets

(56) References Cited

U.S. PATENT DOCUMENTS

| | | | |
|---|---|---|---|
| 6,367,277 B1 | 4/2002 | Kinkel | |
| 8,636,269 B2 | 1/2014 | James | |
| 2007/0227171 A1 | 10/2007 | McMillan et al. | |
| 2008/0173032 A1 | 7/2008 | Kammerzell et al. | |
| 2009/0294548 A1 | 12/2009 | Geiger et al. | |
| 2010/0162737 A1 | 7/2010 | Hall et al. | |
| 2010/0281896 A1* | 11/2010 | Al Watban | F28D 5/00 62/291 |
| 2018/0224174 A1 | 8/2018 | Hollander et al. | |
| 2018/0231264 A1 | 8/2018 | Vadder et al. | |
| 2020/0033037 A1* | 1/2020 | McCaskill, Jr. | F24F 5/0035 |

\* cited by examiner

AUTOMATED EVAPORATIVE SYSTEM FLUSH

BACKGROUND

I. Field of the Disclosure

The technology of the disclosure relates generally to evaporative cooling systems and, more particularly, to controlling a flush process in evaporative cooling systems.

II. Background

An evaporative cooler or cooling system is a system that cools air through the evaporation of water. Evaporative cooling differs from typical air conditioning systems, which use vapor-compression or absorption refrigeration cycles. Evaporative cooling works by exploiting water's large enthalpy of vaporization. The temperature of dry air can be dropped significantly through the phase transition of liquid water to water vapor (evaporation). This can cool air using much less energy than refrigeration. In extremely dry climates, evaporative cooling of air has the added benefit of conditioning the air with more moisture for the comfort of building occupants.

Evaporative cooling systems can be particularly effective for cooling livestock to reduce heat stress and reduce production loss. Evaporative cooling is an indirect cooling method that utilizes air entering or inside a barn. The barn may be outfitted with evaporative cooling pads that work by pulling air through a media that is saturated with water. As the water is evaporated, it cools and humidifies the air entering the barn. This cool and humid air then increases convective heat loss from the animals in the barn compared to utilizing air at ambient conditions. Although requiring more equipment and management than a simple tunnel ventilation system, cooling pads offer the opportunity to both reduce heat stress on animals during the hot portion of the day and to cool the barn down quickly in the evening to allow for maximum recovery time for the animals.

Thus, evaporative cooling systems include a water supply to provide water to saturate the evaporative cooling pads. A water trough or tank may be employed to store water that is then pumped by a water pump(s) to the evaporative cooling pads for saturation. For a commercially practically sized barn, it is not uncommon in typical operating conditions to evaporate 1500-2000 gallons of water daily. A byproduct of evaporation is that any minerals or contaminants in the water when the water is introduced to the cooling pads remains in the cooling pads as the water evaporates. As more water evaporates, the concentration of such minerals and contaminants increases. As the level of contaminants embedded in the cooling pads increases, the efficiency of the evaporative cooling decreases and the usable life of the evaporative media also decreases.

Currently, these accumulated contaminants are manually flushed. That is, a valve is manually opened and any water within the cooling pads is allowed to drain. Fresh water (from the original water source) is used to rinse the pads, with the rinse water also being drained from the cooling pads. This process takes approximately two hours for a normally sized barn. If done during the day, such draining may interrupt needed cooling for the livestock. Accordingly, there is room for a better system to flush the cooling pads within an evaporative cooling system.

SUMMARY OF THE DISCLOSURE

Aspects disclosed herein include an automated flush system for an evaporative cooling system. An evaporative cooling system may be employed in barns or other facilities that house animals to provide cooling and to reduce production loss. The evaporative cooling control system may include an automated flush system that has a controllable valve at a flush end of the cooling system. Based on a timer, the controllable valve is opened and water drains (e.g., pumped or gravity feed) out of the cooling pad enclosure. Fresh water is introduced at the "fill" end of the system, rinsing out the evaporative cooling pads. After a predetermined time, the valve at the flush end of the system is closed, and the fresh water refills the cooling pad enclosure.

In a first exemplary aspect, an evaporative cooling system is disclosed. The evaporative cooling system comprises an enclosure configured to contain cooling media. The evaporative cooling system also comprises a drain valve fluidly coupled to the enclosure and configured to drain fluids from the enclosure. The evaporative cooling system also comprises an automated flush system. The automated flush system comprises a photocell configured to detect ambient light indicative of daytime. The automated flush system also comprises a control circuit coupled to the photocell and the drain valve. The control circuit is configured to compare an output from the photocell to a threshold to determine if a predetermined amount of time has passed. The control circuit is also configured to, when the threshold has been passed, open the drain valve.

In another aspect, an automated flush system is disclosed. The automated flush system comprises a drain valve configured to be positioned in a drain line of an evaporative cooling system. The automated flush system also comprises a photocell. The automated flush system also comprises a control circuit coupled to the drain valve and the photocell. The control circuit is configured to measure an amount of time passed using the photocell. The control circuit is also configured to, when a predetermined amount of time has passed, open the drain valve.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
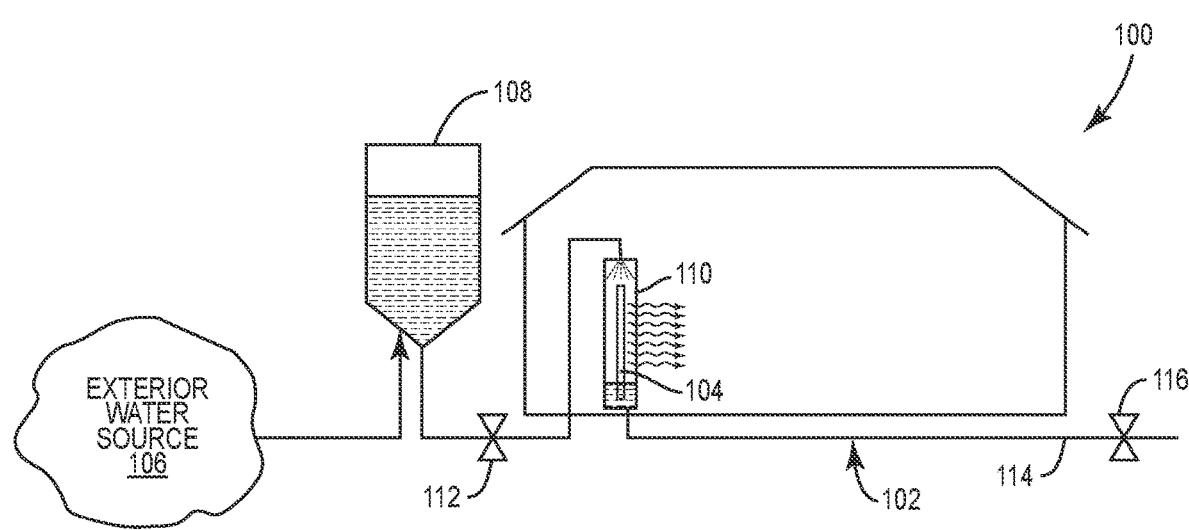
FIG. 1 is a diagram of an evaporative cooling system in a building such as an animal barn that may use an automated flush system according to exemplary aspects of the present disclosure.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed herein include automated evaporative flush systems for an evaporative cooling system. An evaporative cooling system may be employed in barns or other facilities that house animals to provide cooling and to reduce production loss. The evaporative cooling control system may include an automated flush system that has a controllable valve at a flush end of the cooling system. Based on a timer, the controllable valve is opened and water drains (e.g., pumped or gravity feed) out of the cooling pad enclosure. Fresh water is introduced at the "fill" end of the system, rinsing out the evaporative cooling pads. After a predetermined time, the valve at the flush end of the system is closed, and the fresh water refills the cooling pad enclosure.

In this regard, FIG. 1 is a stylized representation of a building 100, which may be, for example, an animal barn. The building 100 incorporates an evaporative cooling system 102 with cooling pads 104 or other media (generically evaporative media). An exterior water source 106, such as a municipal water line, a well, a pond, lake, river, stream, or the like, may provide water to a water supply 108. Water from the water supply 108 may selectively be provided to a cooling pad enclosure 110 by opening and closing of a water supply intake valve 112. The cooling pad enclosure 110 may include a reservoir of water that wicks into the cooling pads 104, and/or water may be sprayed onto the cooling pads 104 such as through a sprinkler system as is well understood.

The cooling pad enclosure 110 may include a drain line 114 that is selectively opened by a drain valve 116. Exemplary aspects of the present disclosure provide a mechanism to open and close the drain valve 116 automatically for predetermined amounts of time and on a predetermined schedule so that the drain valve 116 no longer requires manual operation. Removing the requirement for manual operation allows the operator to optimize when the flushing occurs (e.g., at night when cooling demand is less) and allows the operator to do other things while the flushing occurs.

Figure 2:
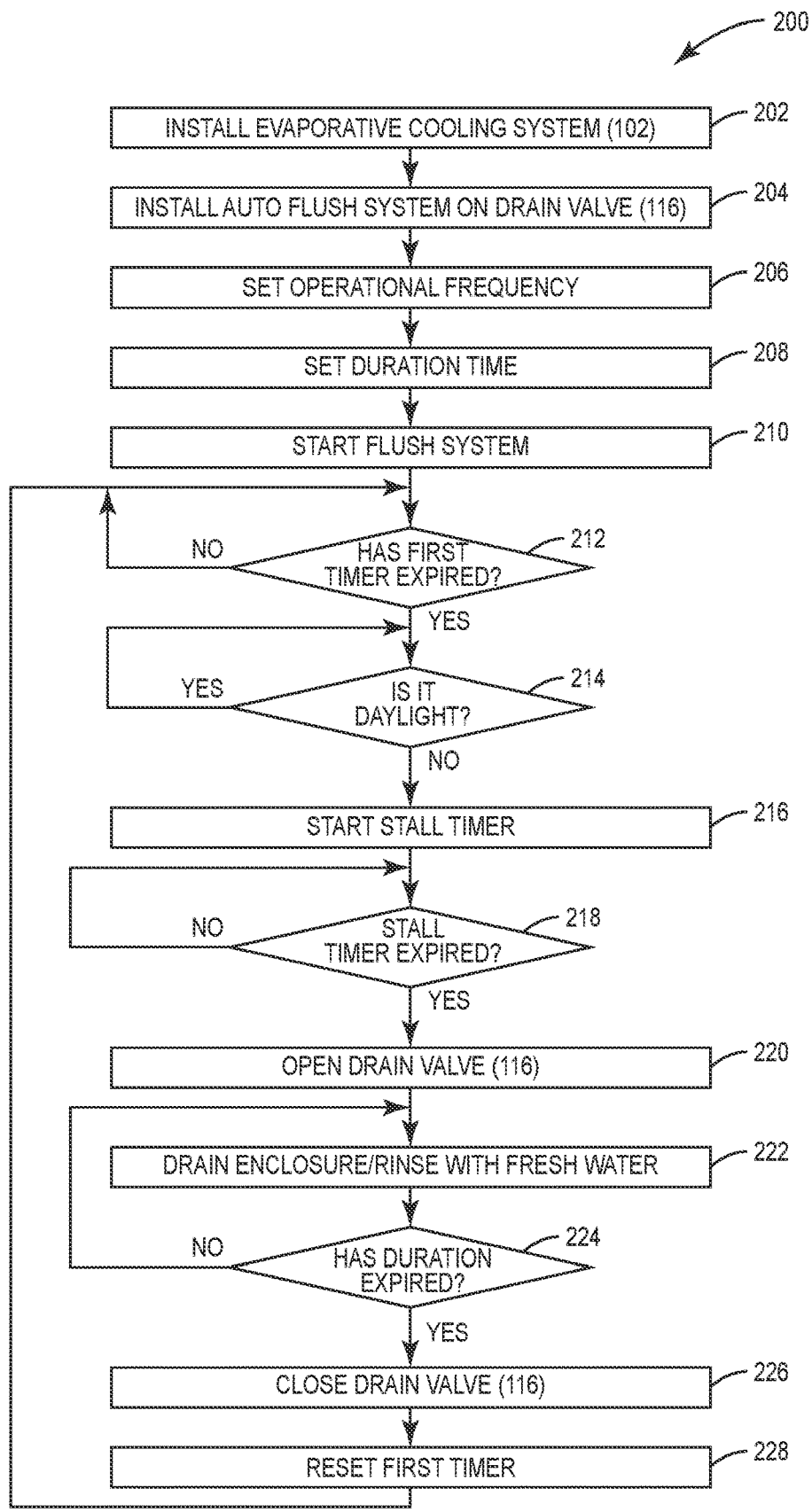
FIG. 2 is a flowchart illustrating a process for using an automated flush system according to exemplary aspects of the present disclosure.

FIG. 2 provides an overview of a process 200 of using an automated flush system according to exemplary aspects of the present disclosure. In this regard, the process 200 begins with the installation of an evaporative cooling system 102 (block 202) into a building 100 such as an animal barn. After installation of the evaporative cooling system 102 or concurrently therewith, an auto flush system is installed on the drain valve 116 (block 204). The operator may then set an operating frequency (block 206). The operating frequency may be a number of days between flushes. While any number may be used, exemplary values are five to forty days between flushes. This number may be selected by the operator based on how heavily the exterior water source 106 is contaminated with minerals and the like, which in turn dictates how quickly such contaminants may accumulate on the cooling pads 104 and negatively impact performance of the evaporative cooling system 102.

The operator may also set a duration amount of time (block 208). The duration amount of time corresponds to a period under which the drain valve 116 is open (and draining). While any number of values may be used, exemplary values range from ten to ninety minutes. Once the values for the operating frequency and duration amount of time are set (or if the operator chooses to use the factory defaults), the process 200 may start the flush system (block 210).

A control circuit in the flush system will determine if a first timer has expired (block 212). Equivalently, the control circuit may compare a day count held by a counter to a threshold. The counter or the first timer may correspond to the operating frequency set at block 206. If the answer to block 212 is no, the timer has not expired, then the process 200 monitors until the first timer does expire. Once the first timer expires and the answer to block 212 is yes, the control circuit may use a photocell to determine if it is daylight (block 214). The process 200 waits until it is no longer daylight and then starts a stall timer (block 216). In an exemplary aspect, the stall timer may be four hours. The control circuit monitors the stall timer until it has expired (block 218), then opens the drain valve 116 (block 220). The drain valve 116 may be opened, for example, by providing an initial opening current to a motor and then a maintenance current to hold the valve open.

It should be appreciated that blocks 214, 216, and 218 are optional. However, use of these steps in the process 200 helps ensure that the flush operation takes place at night, and specifically a number of hours after night fall (e.g., four hours after night fall), when the need for cooling in the building 100 is likely to be comparatively low as the heat of the day has passed.

With the drain valve 116 open, the enclosure 110 will drain and may be rinsed with fresh water from the water supply 108 (block 222). In an exemplary aspect, the drain valve 116 and the drain line 114 may be positioned to allow for gravity draining of the enclosure 110. Alternatively, water may be pumped out of the enclosure. Removal of the water from the enclosure 110 may cause the water supply intake valve 112 to open as needed to add water to the evaporative cooling system 102. The mechanics of adding water is not central to the present disclosure, so long as the cooling pads 104 are rinsed and any contaminant buildup is removed or reduced by the flowing water.

The control circuit will monitor to see if the duration amount of time has expired (block 224), allowing the rinsing to continue by keeping the drain valve 116 open so long as the duration amount of time has not expired. Once the duration amount of time has expired, the control circuit may close the drain valve 116 (block 226). Closing the drain valve 116 may be as simple as removing a current previously provided to the drain valve 116. After closing the drain valve 116, the control circuit may reset the first timer (block 228) and return to block 212.

Figure 3:
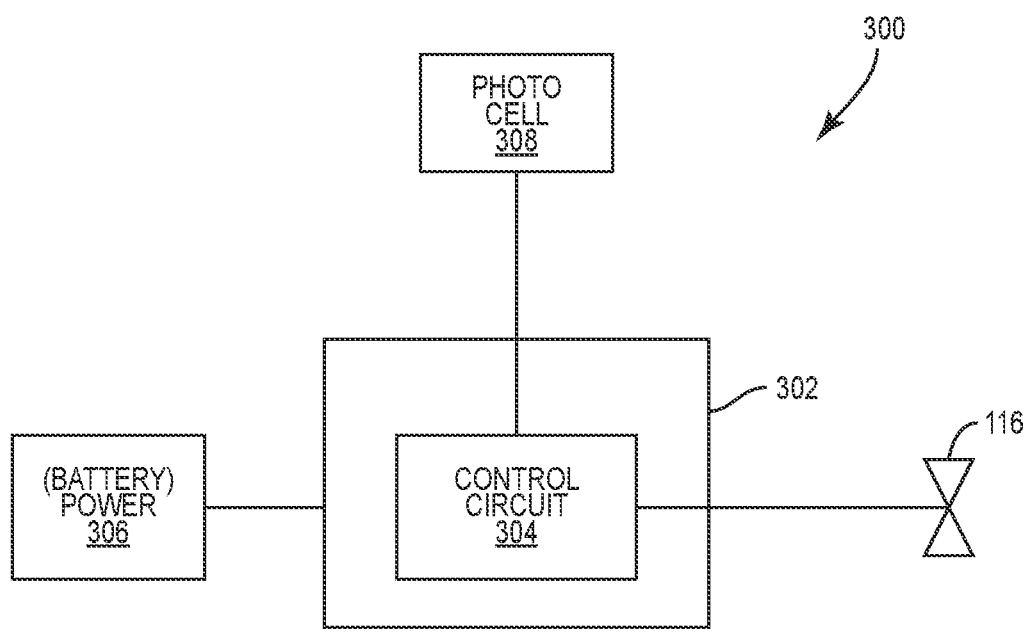
FIG. 3 is a block diagram of the automated flush system attached to a valve.

FIG. 3 provides a schematic diagram of an automated flush system 300 of the present disclosure that is used in the process 200 of FIG. 2. The flush system 300 may include a housing 302 that has a control circuit 304 and associated circuitry (details provided below in reference to FIGS. 4 and 5). The control circuit 304 may receive power from an external source 306. The external source 306, may be, for example, a battery source, a wall outlet, or the like. The control circuit 304 may be coupled to a photocell 308 to assist in determining light levels for block 214 and/or to count days for block 212. In particular, the photocell 308 may be configured to detect ambient light levels indicative of daytime, and the control circuit 304 may increment a counter based on changes detected by the photocell 308 (e.g., every time the light drops below a predetermined threshold, the control circuit 304 infers nightfall and increments a day counter or every time the light rises above a predetermined threshold, the control circuit 304 infers daybreak and increments a counter). Note that while it is possible to increment a counter, equivalently a counter may be decremented. Comparing the counter to a threshold may be functionally equivalent to the first timer of the process 200.

In an exemplary aspect, the drain valve 116 may be a motorized ball valve such as a ¾ inch stainless steel electrical ball valve sold by U.S. Solid, SKU JFMSV00008, found as of this writing at www.ussolid.com. The ball valve may be opened by applying, for example, 100 milliamperes (mA) for five (5) seconds. The ball valve may be held open by providing a maintenance current of 9 mA. Removal of the current may cause the ball valve to close. While this particular arrangement is provided for completeness, it should be appreciated that other valves or valves having different operating parameters may be used without departing from the scope of the present disclosure.

Figure 4:
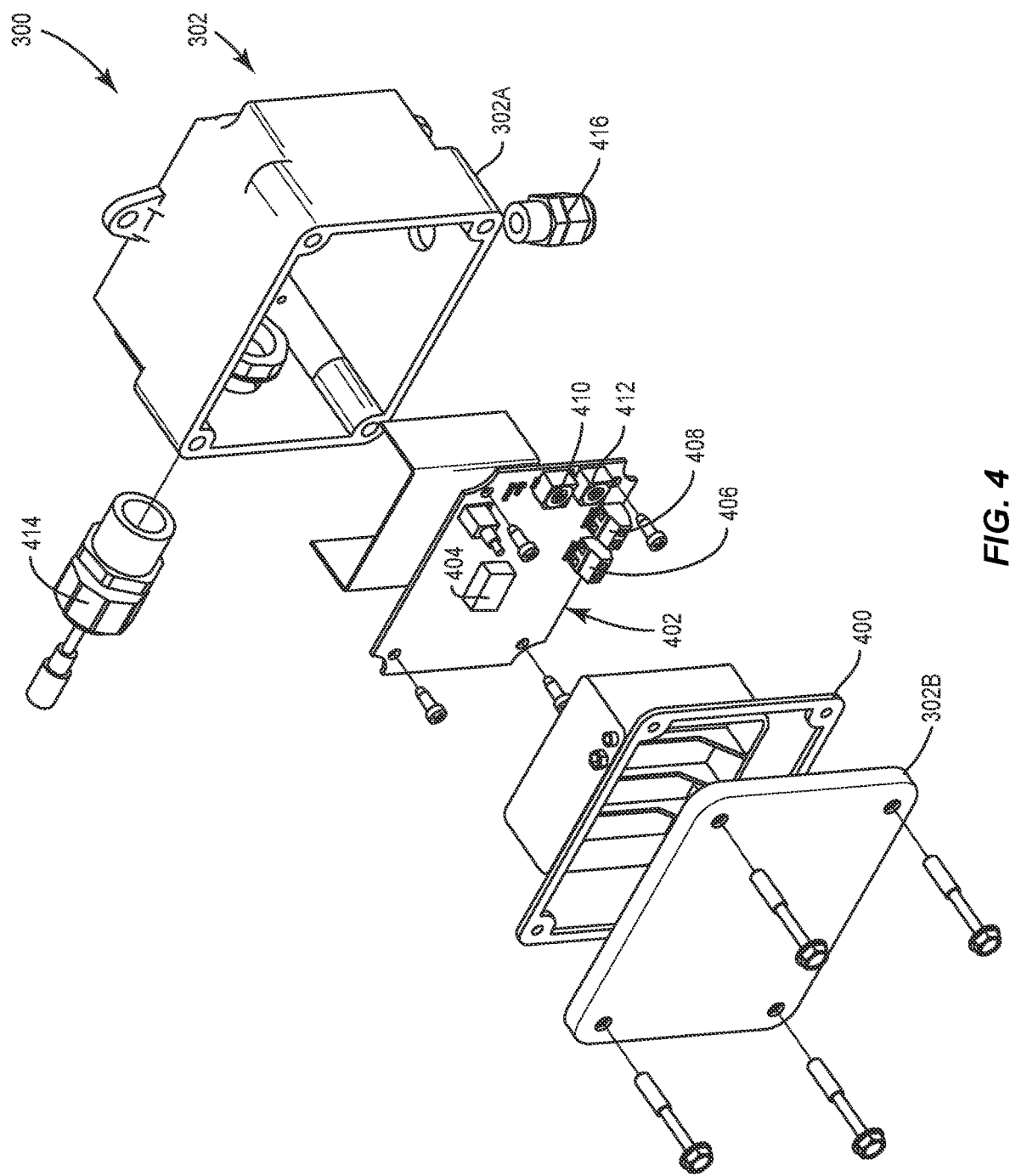
FIG. 4 is an exploded perspective view of a housing containing a control circuit and associated circuitry for the automated flush system.

More details about the automated flush system 300 are provided in FIG. 4. Specifically, the housing 302 may include a boxlike housing back 302A and a front plate 302B with interior mounting structures 400 positioned therein. Bolts, screws, rivets, or the like may be used to secure the housing back 302A to the front plate 302B and/or secure the mounting structures 400 within the housing 302. A printed circuit board (PCB) 402 may be mounted on the interior mounting structures 400 through bolts, screws, rivets, or other fastening means. The PCB 402 may have a control circuit 404, which may be an integrated circuit (IC) or a plurality of circuits as needed or desired. Additional ports 406, 408 may be provided to give connection points to the photocell 308 (not shown in FIG. 4) and the drain valve 116 (also not shown in FIG. 4). Dials 410, 412 may be provided to set the operating frequency and the duration amount of time. Connectors 414 and 416 may fill apertures through which wires pass from the external power source 306 and to the drain valve 116, respectively.

Figure 5:
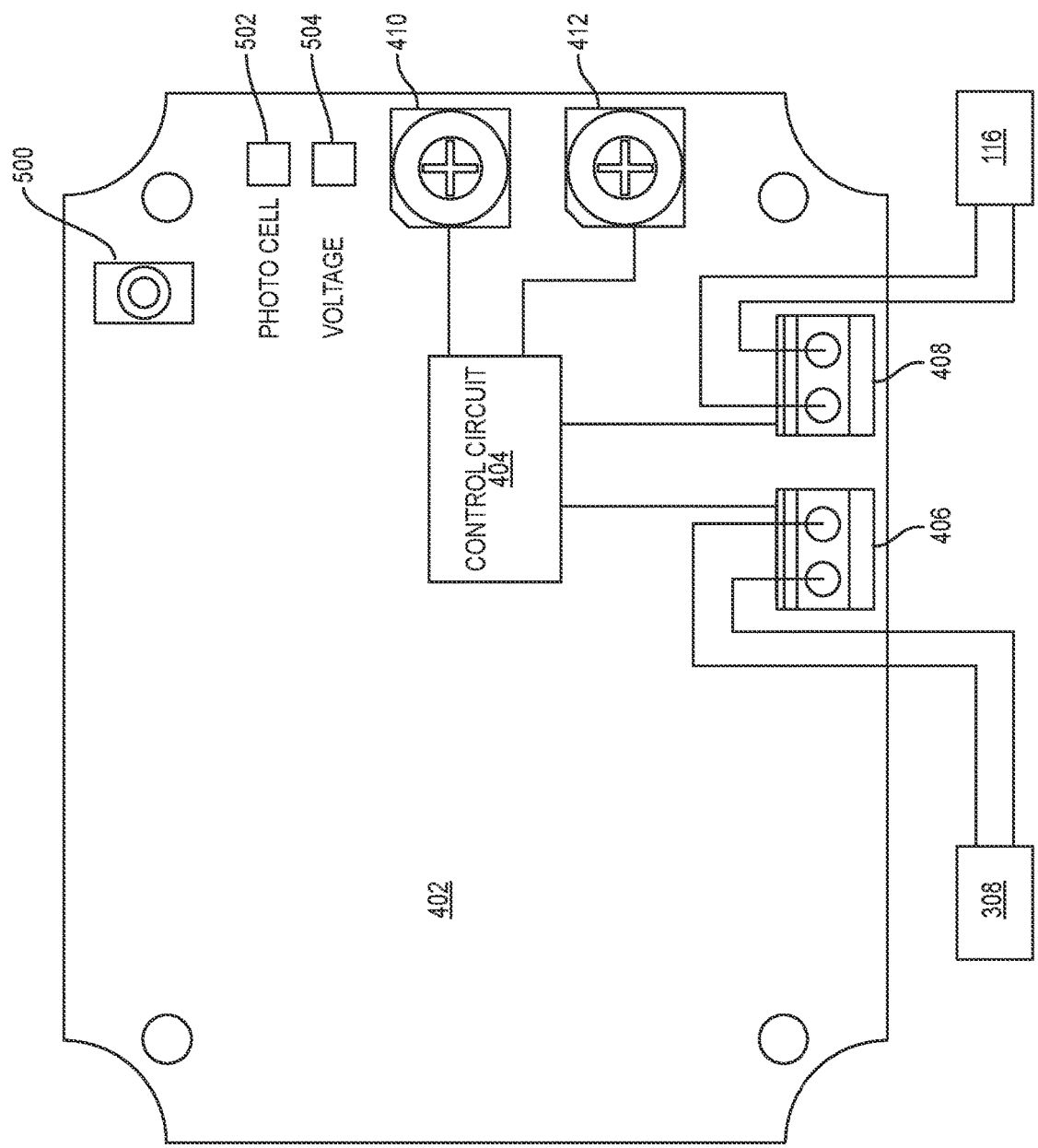
FIG. 5 is a front plan view of a printed circuit board for the control circuit and associated circuitry.

Additional elements mounted on the PCB 402 are illustrated in FIG. 5. A test button 500 and light emitting diodes (LEDs) 502, 504 may be provided on the PCB 402. The test button 500 may be depressed to initiate a self-test, which may cause the LEDs 502, 504 to illuminate on successful conclusion of the self-test and particularly, the LED 502 may be lit when the photocell 308 detects light, and the LED 504 may be lit when there is a voltage present at the port 408.

Figure 6:
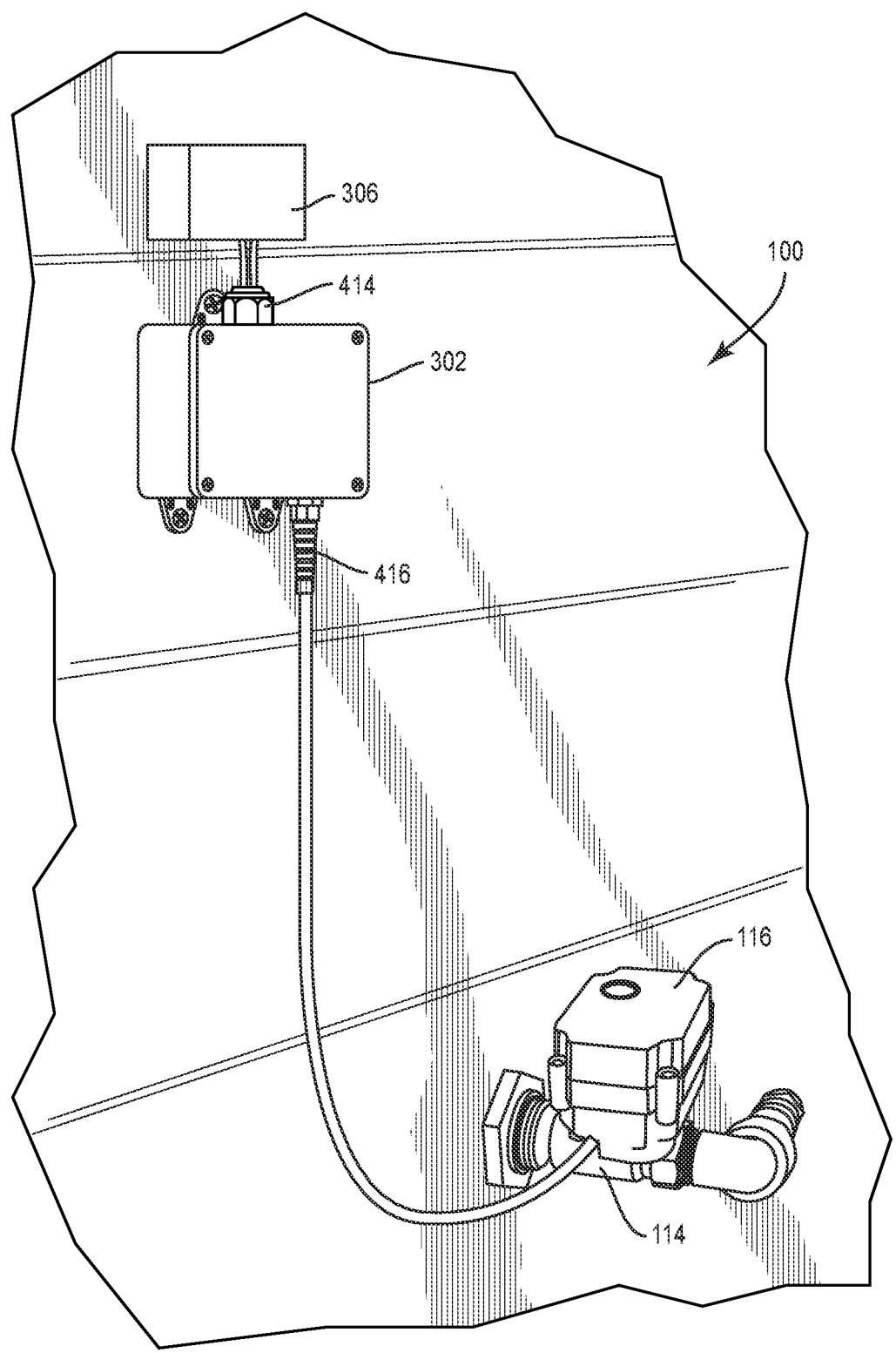
FIG. 6 is a perspective view of the housing mounted on the side of a building and coupled to a valve that is in line with a drain line for an evaporative cooling system.

FIG. 6 shows the housing 302 mounted on a building 100 and coupled to a drain valve 116.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. An evaporative cooling system comprising:
an enclosure configured to contain cooling media;
a drain valve fluidly coupled to the enclosure and configured to drain fluids from the enclosure; and
an automated flush system comprising:
a control circuit coupled configured to determine whether a day count period associated with an operating frequency has expired;
a photocell configured to detect ambient light indicative of daytime; and
the control circuit coupled to the photocell and the drain valve and further configured to:
compare an output from the photocell to a threshold to determine if a predetermined amount of time has passed after the day count period has expired; and
when the threshold has been passed, open the drain valve.

2. The evaporative cooling system of claim 1, further comprising a water supply intake valve, wherein the enclosure is fluidly coupled to the water supply intake valve.

3. The evaporative cooling system of claim 1, wherein the cooling media comprises cooling pads.

4. The evaporative cooling system of claim 1, wherein the drain valve comprises a ball valve.

5. The evaporative cooling system of claim 1, wherein the automated flush system comprises an external power source comprising a battery.

6. The evaporative cooling system of claim 1, further comprising a drain line, wherein the drain valve is positioned in line with the drain line and the drain line couples the enclosure to the drain valve.

7. The automated flush system of claim 1, wherein the control circuit is configured to count a number of nightfalls using the photocell.

8. An automated flush system, comprising:
a drain valve configured to be positioned in a drain line of an evaporative cooling system;
a photocell; and
a control circuit coupled to the drain valve and the photocell, the control circuit configured to:
measure an amount of time passed using the photocell by counting a number of nightfalls; and
when a predetermined amount of time has passed after the number of nightfalls exceeds a threshold, open the drain valve.

9. The automated flush system of claim 8, further comprising a housing and a printed circuit board (PCB), wherein the control circuit is mounted on the PCB and the PCB is positioned in the housing.

10. The automated flush system of claim 8, further comprising a user input module configured to receive user input to indicate the predetermined amount of time.

11. The automated flush system of claim 10, wherein the user input comprises a dial.

12. The automated flush system of claim 8, further comprising a user input configured to receive user input to indicate a duration amount of time to keep the drain valve open.

13. The automated flush system of claim 12, wherein the control circuit is configured to keep the drain valve open for the duration amount of time.

14. The automated flush system of claim 8, wherein the drain valve comprises a ball valve.

15. The automated flush system of claim 8, wherein the control circuit is configured to be coupled to a battery power source.

16. The automated flush system of claim 8, further comprising a stall timer configured to start based on an indication of nightfall from the photocell, and wherein the control circuit is configured to open the drain valve at an expiration of the stall timer.

17. An automated flush system, comprising:
a drain valve configured to be positioned in a drain line of an evaporative cooling system;
a photocell;
a stall timer configured to start based on an indication of nightfall from the photocell; and
a control circuit coupled to the drain valve and the photocell, the control circuit configured to:
measure an amount of time passed using the photocell by counting a number of nightfalls; and
when a predetermined amount of time has passed based on the stall timer, open the drain valve.

18. The automated flush system of claim 17, further comprising a housing and a printed circuit board (PCB), wherein the control circuit is mounted on the PCB and the PCB is positioned in the housing.

19. The automated flush system of claim 17, further comprising a user input module configured to receive user input to indicate the predetermined amount of time for the stall timer and an operating frequency for a second timer.

20. The automated flush system of claim 19, wherein the user input comprises a dial.

* * * * *